(12) United States Patent
Fritschen

(10) Patent No.: US 7,516,970 B2
(45) Date of Patent: Apr. 14, 2009

(54) BICYCLE WITH NON-COLLINEAR SEAT TUBE AND SEAT TUBE SLEEVE

(76) Inventor: Thomas M. Fritschen, P.O. Box 145, Fountain, CO (US) 80817

( * ) Notice: Subject to any disclaimer, the term of this patent is extended or adjusted under 35 U.S.C. 154(b) by 0 days.

(21) Appl. No.: 11/558,075

(22) Filed: Nov. 9, 2006

(65) Prior Publication Data

US 2007/0114753 A1   May 24, 2007

Related U.S. Application Data

(63) Continuation of application No. 11/225,856, filed on Sep. 13, 2005, now Pat. No. 7,188,852, which is a continuation of application No. 11/021,462, filed on Dec. 22, 2004, now Pat. No. 6,955,372, which is a continuation of application No. 10/313,294, filed on Dec. 6, 2002, now Pat. No. 6,848,700, which is a continuation of application No. 09/490,371, filed on Jan. 24, 2000, now Pat. No. 6,503,589, which is a continuation of application No. 08/811,138, filed on Mar. 3, 1997, now Pat. No. 6,017,048, which is a continuation of application No. 08/687,266, filed on Jul. 25, 1996, now abandoned, which is a continuation of application No. 08/112,449, filed on Aug. 27, 1993, now abandoned, which is a continuation-in-part of application No. 07/894,576, filed on Jun. 5, 1992, now abandoned.

(51) Int. Cl.
*B62K 19/00* (2006.01)

(52) U.S. Cl. .................. 280/281.1; 280/288.3; D12/111

(58) Field of Classification Search .............. 280/281.1, 280/288.3; D12/111
See application file for complete search history.

(56) References Cited

U.S. PATENT DOCUMENTS

| 2,378,961 | A | * | 6/1945 | Wallace et al. | ............ 280/288.3 |
| D225,912 | S | * | 1/1973 | Sekine | ...................... D12/111 |
| D299,121 | S | * | 12/1988 | Oh | ............................. D12/111 |
| D329,409 | S | * | 9/1992 | Allsop et al. | ................ D12/111 |
| 5,273,303 | A | * | 12/1993 | Hornzee-Jones | ......... 280/288.3 |
| 5,415,423 | A | * | 5/1995 | Allsop et al. | ............. 280/281.1 |

* cited by examiner

*Primary Examiner*—Kevin Hurley
(74) *Attorney, Agent, or Firm*—Mark G. Pannell; Hanes & Schutz, LLC

(57) ABSTRACT

Disclosed herein are various embodiments, including but not limited to a bicycle that includes, among other features, an elongated down tube and a single elongated seat tube, the longitudinal axis of the seat tube intersecting the longitudinal axis of the down tube at a location substantially intermediate between the first and second ends of the down tube, wherein the distance between the spaced apart side outer surfaces of each of the down tube and the seat tube are less than the distance between the upper and lower outer surfaces of each of the down tube and seat tube; additionally including a seat tube, a seat tube sleeve, a crank assembly and a bottom bracket sleeve for mounting the crank assembly, wherein the seat tube sleeve has an upper end, a lower end, and a longitudinal axis extending from the upper end to the lower end; the seat tube being disposed within the seat tube sleeve, the longitudinal axis of the seat tube sleeve intersecting the bottom bracket sleeve.

20 Claims, 10 Drawing Sheets

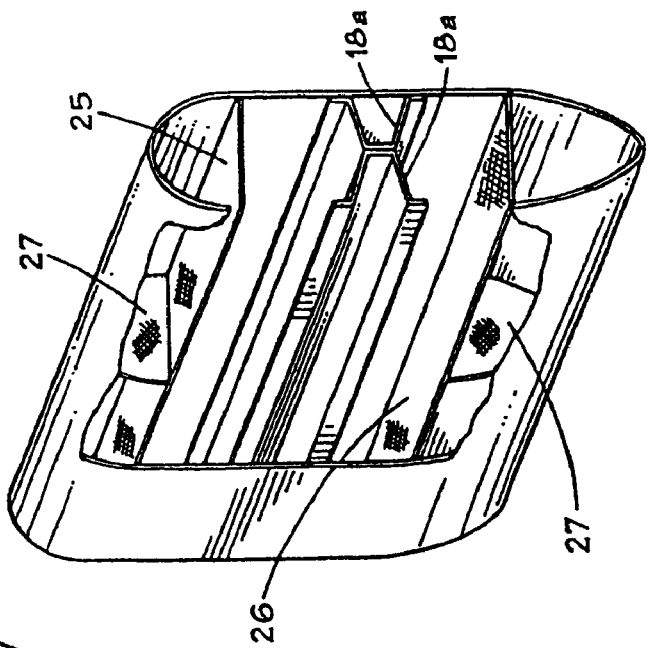
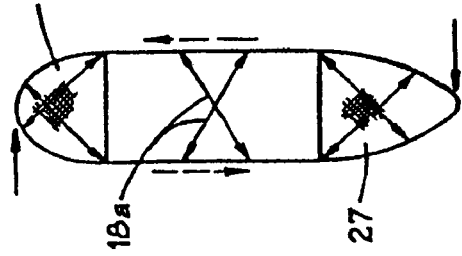
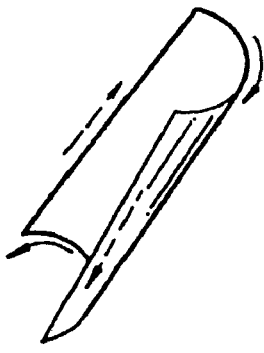
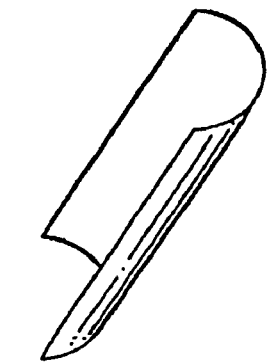
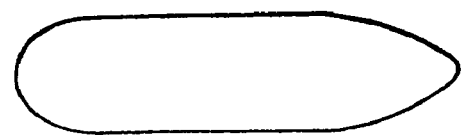

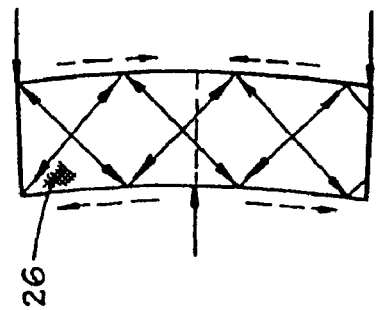
FIG. 4D
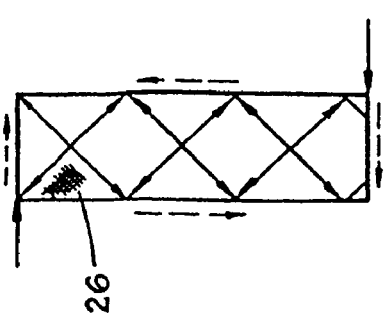
FIG. 4C
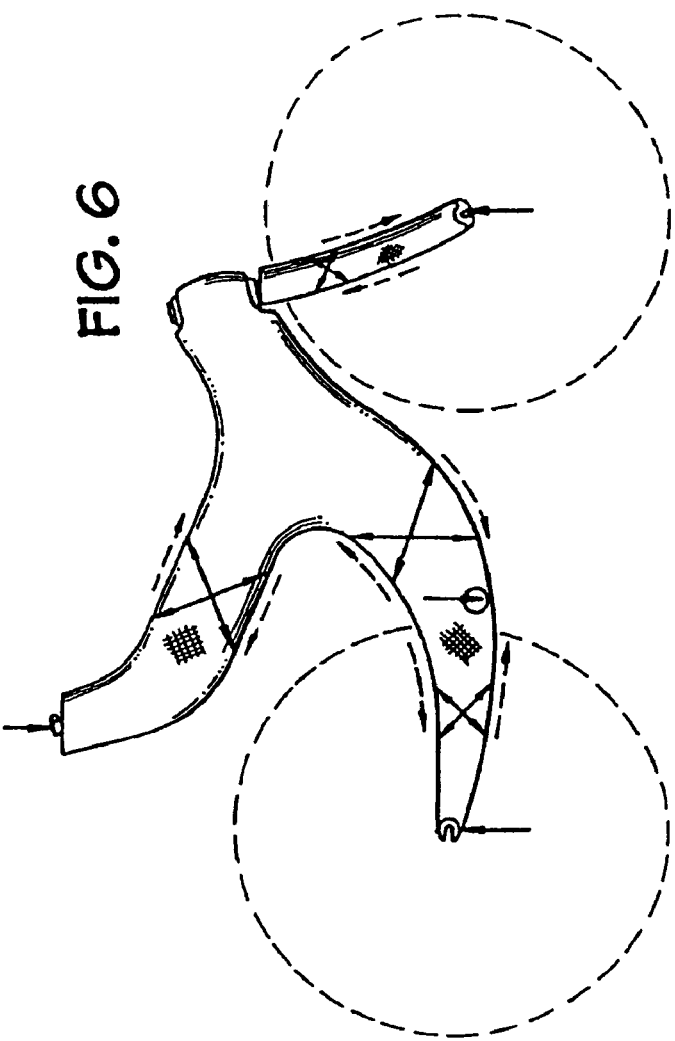
FIG. 6
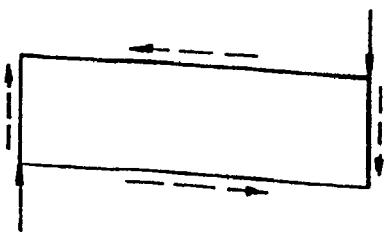
FIG. 4B
FIG. 5B
FIG. 4A
FIG. 5A

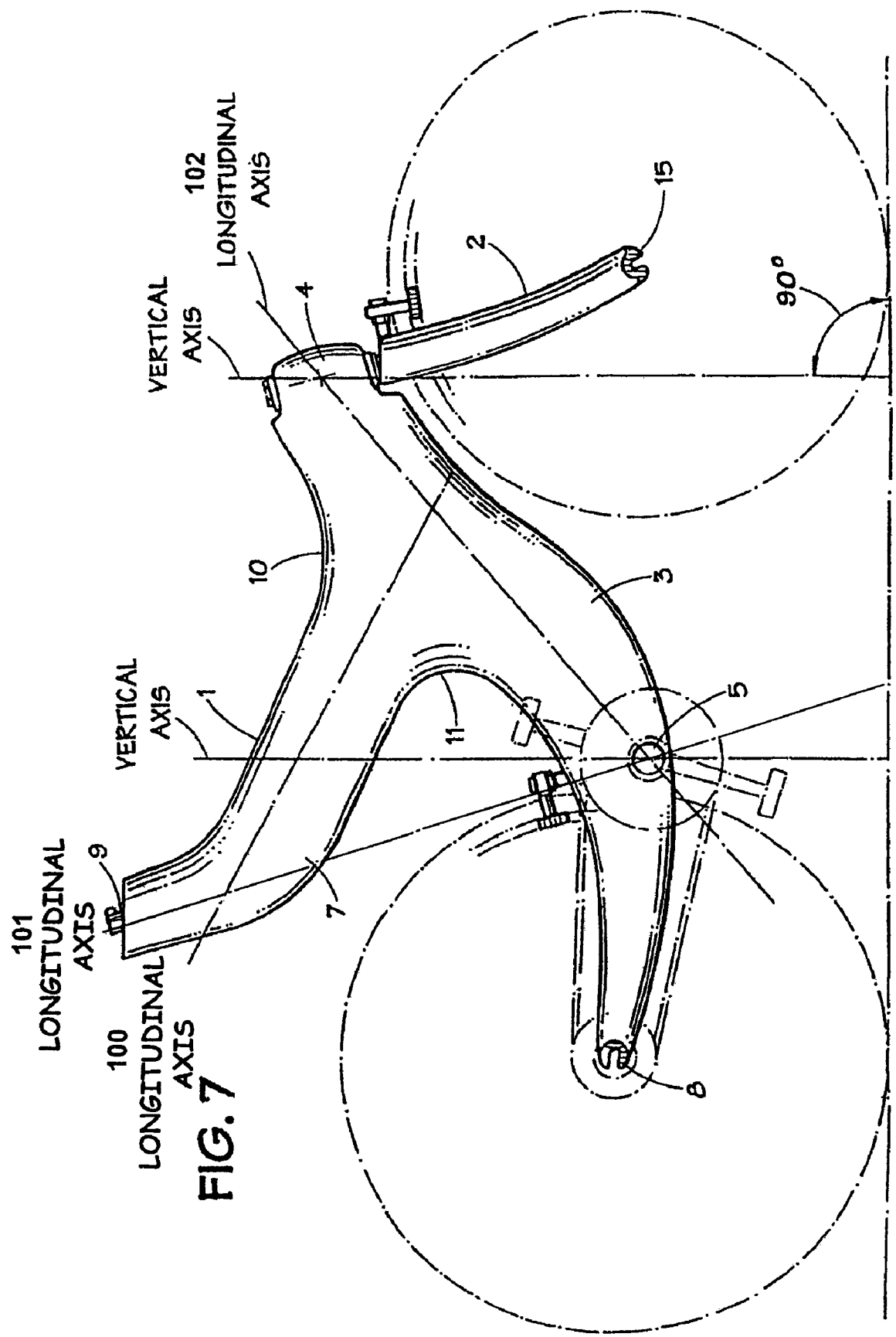

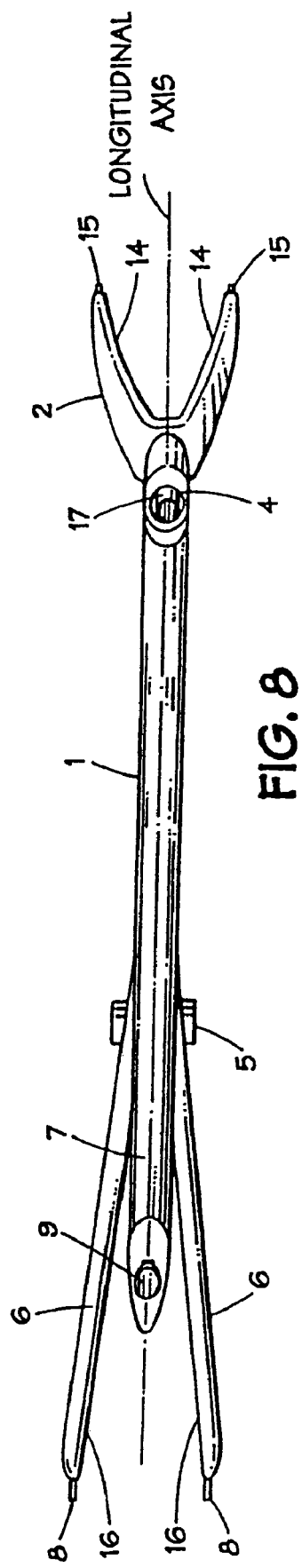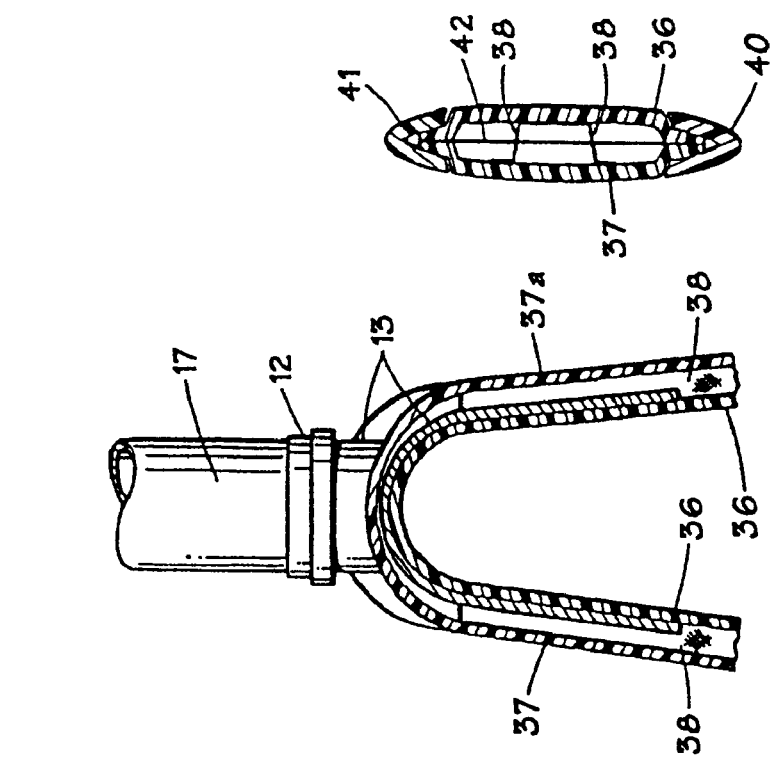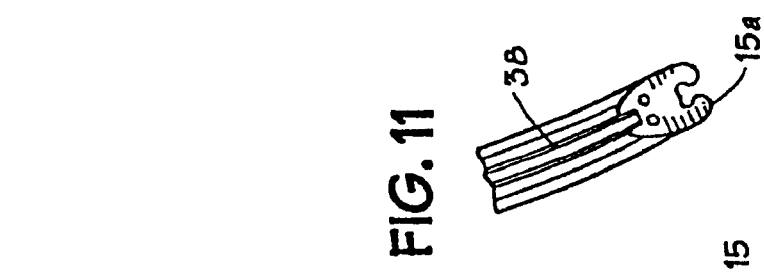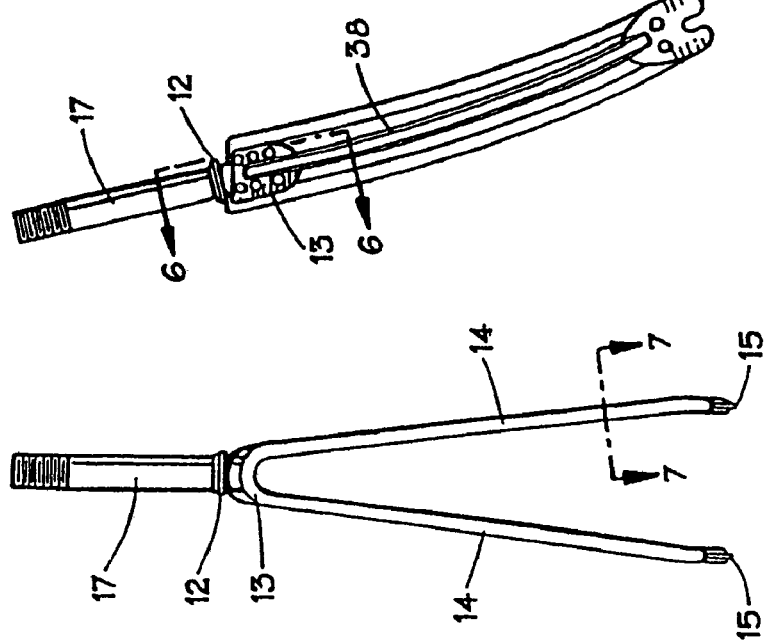

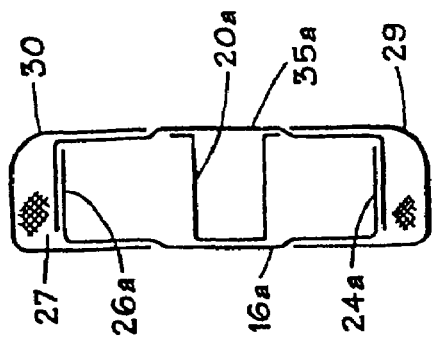
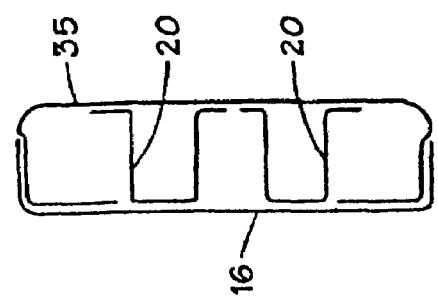
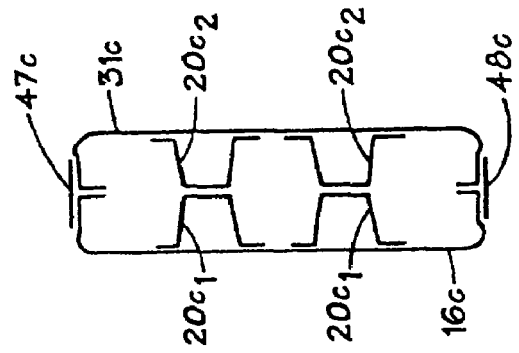
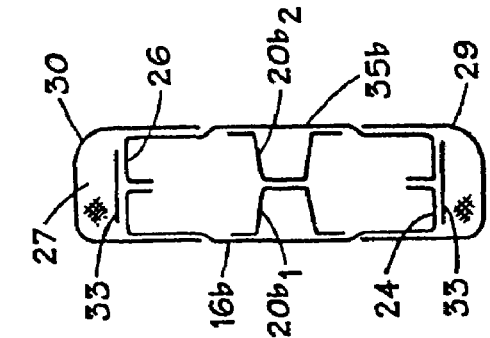
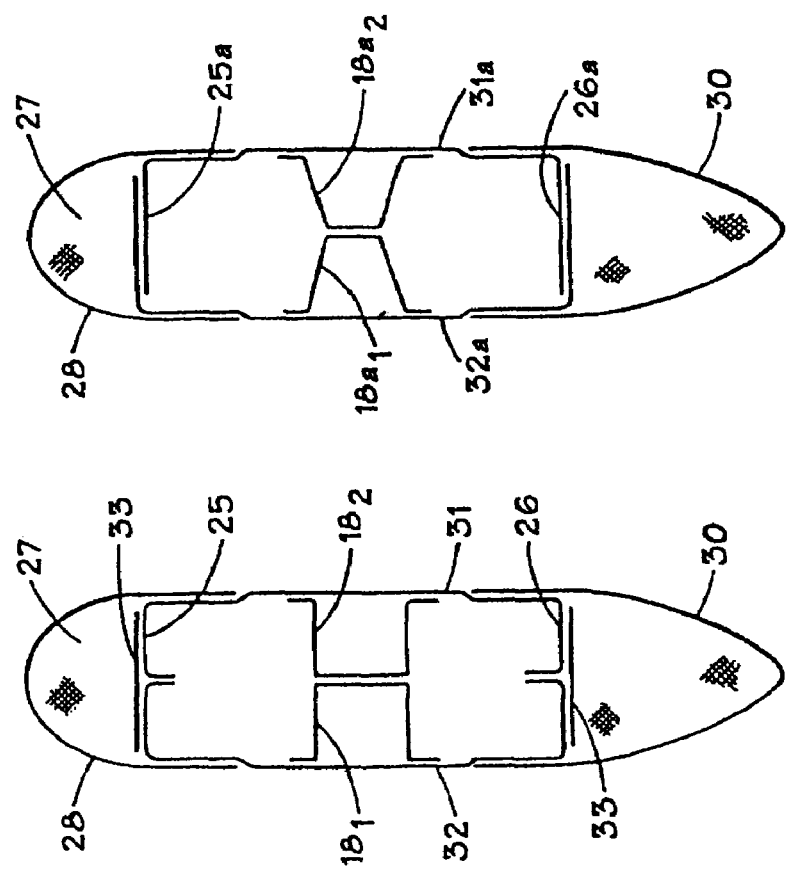

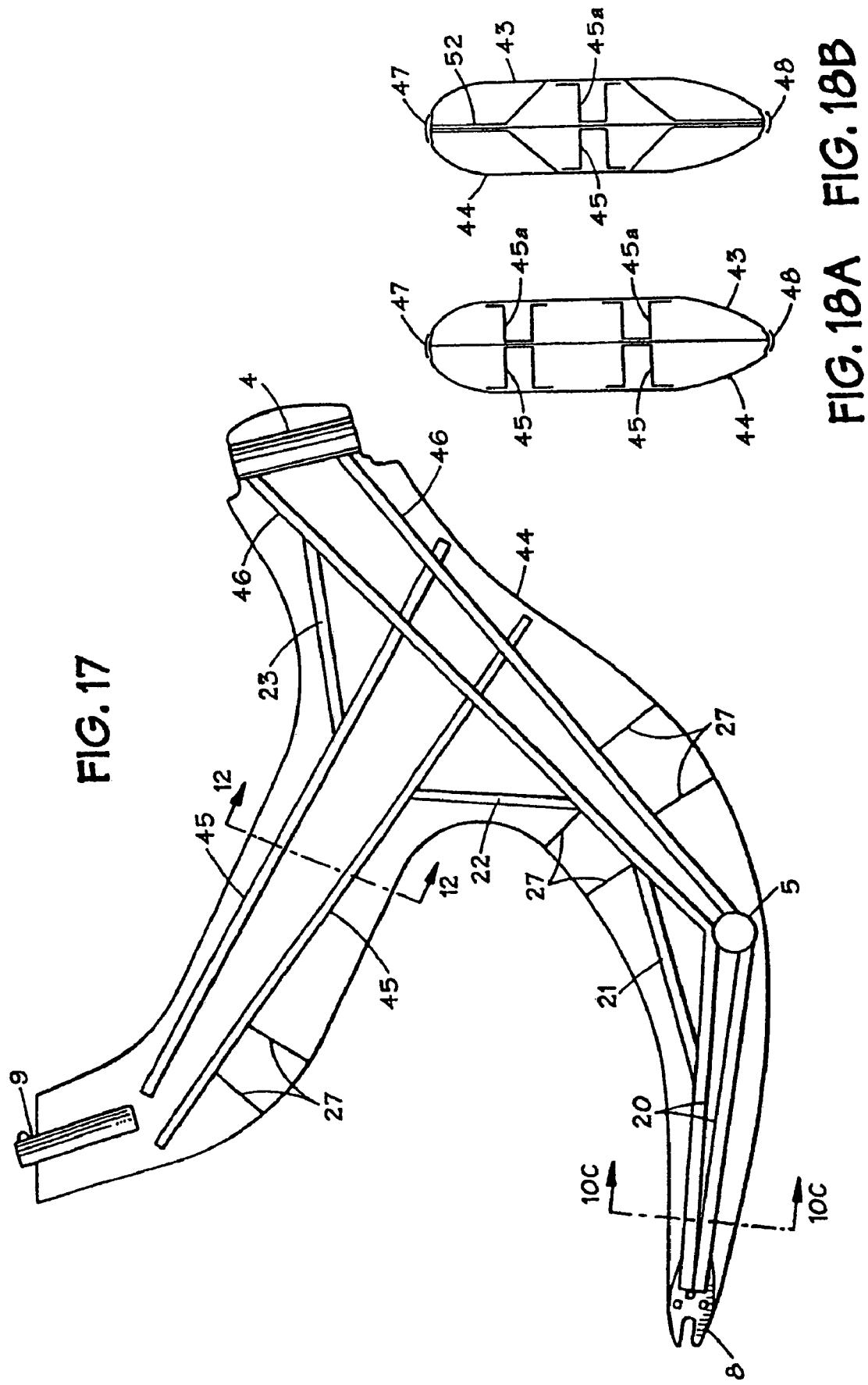

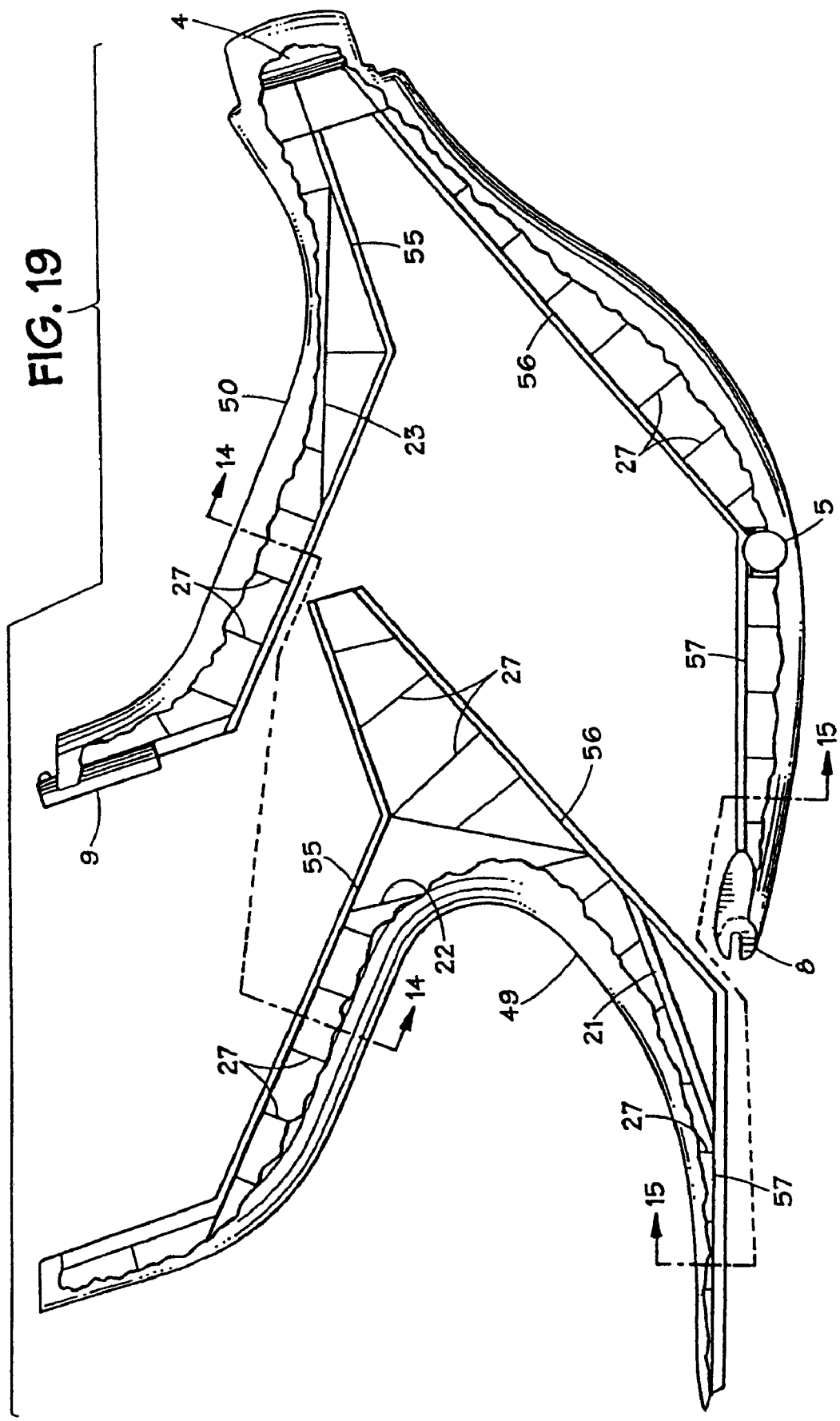

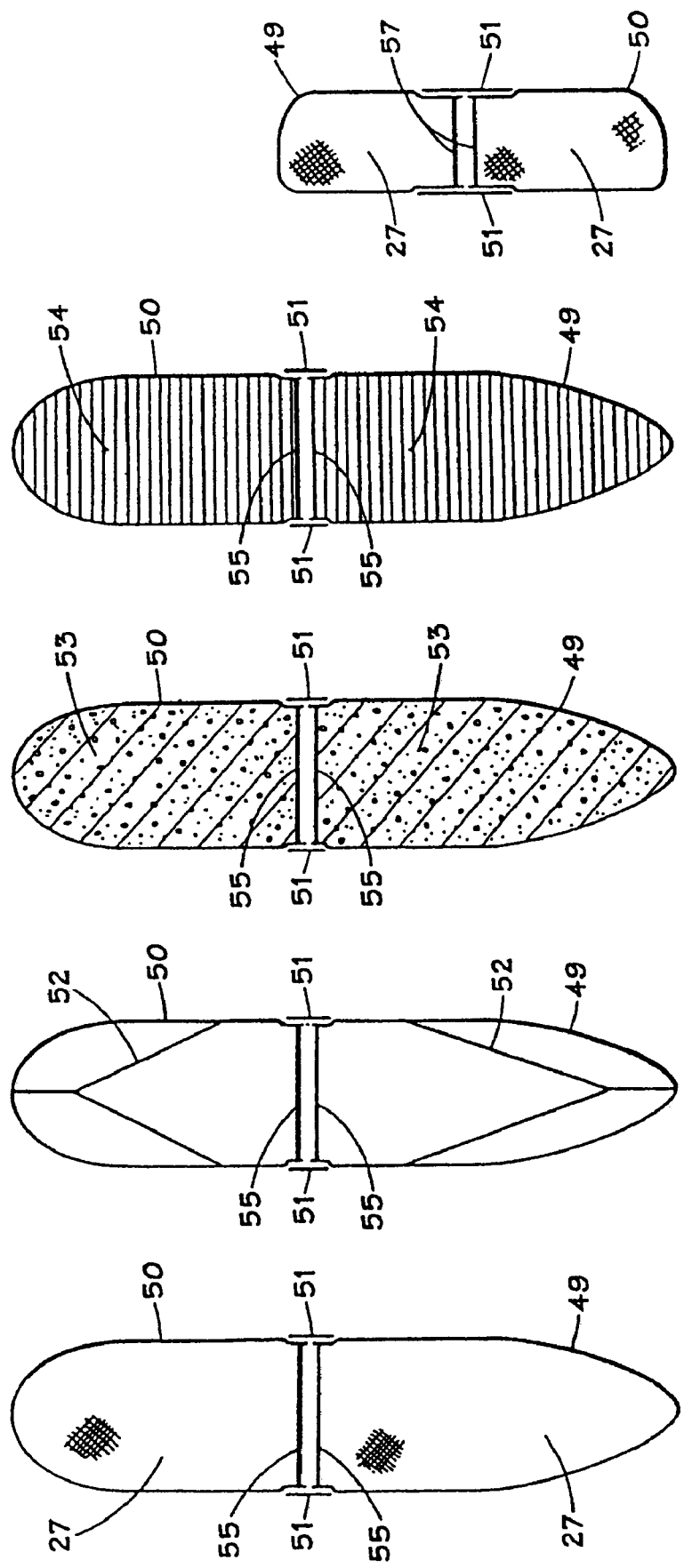

BICYCLE WITH NON-COLLINEAR SEAT TUBE AND SEAT TUBE SLEEVE

RELATED APPLICATIONS

This application is a continuation of U.S. patent application Ser. No. 11/225,856, filed Sep. 13, 2005, now U.S. Pat. No. 7,188,852 which is a continuation of U.S. patent application Ser. No. 11/021,462, filed Dec. 22, 2004, now U.S. Pat. No. 6,955,372, which is a continuation of U.S. patent application Ser. No. 10/313,294, filed Dec. 6, 2002, now U.S. Pat. No. 6,848,700, which is a continuation of U.S. patent application Ser. No. 09/490,371, filed Jan. 24, 2000, now U.S. Pat. No. 6,503,589, which is a continuation of application Ser. No. 08/811,138, filed Mar. 3, 1997, now U.S. Pat. No. 6,017,048, which application is a continuation of application Ser. No. 08/687,266, filed Jul. 25, 1996, now abandoned, which application is a continuation of application Ser. No. 08/112,449, filed Aug. 27, 1993, now abandoned, which application is a continuation-in-part of application Ser. No. 07/894,576, filed Jun. 5, 1992, now abandoned.

FIELD OF THE INVENTION

The invention relates, in general, to a bicycle frame that is aerodynamically shaped, lightweight, and stiff, including a main frame structure and front fork assembly, and in particular to the integral tension configuration, integral outer shell, integral tension struts, and integral tension ribs used in its construction.

DESCRIPTION OF THE PRIOR ART

Known prior art includes both traditional frame design, using traditional construction techniques and materials, and more recent innovative frame design, using new construction techniques and materials.

Traditional frame design and construction were developed under relatively limited availability of materials. As steel was readily available, cost effective, and relatively easy to form into simple structural shapes, round steel tubes were found to be the most efficient structural element to use in bicycle frame manufacturing. The construction technique used included the cutting and fitting of these tubes, and brazing them together at their joints with or without joint lugs.

Since traditional frame design, was developed primarily under the availability of round straight steel tubes, it primarily employed a two triangle design, with a rear triangle to carry rider load, and to hold the rear wheel, and a front or main triangle that also carried rider load and joined the rear triangle to the head tube and front fork thereof, and a front fork made of steel tubes. This was known as the safety bicycle.

From a structural standpoint the traditional two triangle design is essentially a very simple, short, open web truss. The top tube acts as a top boom, the down tube and rear wheel stays act as a bottom boom, and the seat tube and seat stays act as inclined interconnecting members between the top boom and the bottom boom, as in a typical open web truss of a bridge, for example.

A typical open truss is comprised of a top boom, a bottom boom, and interconnecting vertical and/or inclined members between the two. When a vertical load force is applied to such an open web truss, the top bottom is subjected to resultant compression forces, and the bottom boom is subjected to resultant tension forces, while the interconnecting members used to resist compression and sheer forces between the upper and lower booms may employ a combination of compression and tension members.

FIGS. 1A and 1B illustrate the similarities between the two structures by way of side view diagrams, and the directions of operative tension and compressive forces by arrows, with arrows pointing away from each other representing tension, and those point towards each other representing compression.

The simple open web truss that comprises the bicycle frame structure of the two triangle design is supported at each end with the axle of the wheels, in a way similar to a bridge truss abutment; indirectly through the front fork in the front end, and directly in the rear. When a rider load is applied to the top of the bicycle it causes the top tube and seat stays to go into compression, and the down tube and rear wheel stays to go into tension, while the seat tube, and seat stays act as inclined compression and shear resistant members.

The compressive and tensile strength characteristics of steel tubes, their availability and cost, and their workability, made them highly suitable for the two triangle design, and conversely made this design a very efficient and practical configuration, and most builders still use it with minor variations in the frame geometry.

Round steel tubes also work well to resist lateral and torsional flexes, and their ability to do so can improve by such things as adding flutes, internal rifling, double and triple butting, and increasing their diameter. Such increases in strength were sought to improve performance and allow weight reduction.

An essential structural feature of this design, however, is that it includes vertical and inclined members, and their postures limit their ability to receive significant aerodynamic improvement, even though attempts were made to do so by reducing frontal area, by using oval and tear drop tube shapes, reducing front wheel size, sloping the top tube, and so on.

So, even through the traditional two triangle design has desirable features in stiffness, weight, and vertical load bearing capability, its limitations in aerodynamics, as well as the need for speed in the area of competitive cycling, have driven on the search for more aerodynamically efficient configurations.

Other materials that have become more available, such as aluminum, titanium, and fiber reinforced composites, have provided builders with the opportunity to attempt new and innovative designs, that reduce frame weight and may offer significant improvements in aerodynamic efficiency.

While some bicycle frame builders have merely substituted tubes made of these materials for steel tubes, and gluing or welding of the joints in place of brazing in the traditional two triangle design, others have used new materials, in particular, fiber reinforced composites, to produce new bicycle frame designs which are aerodynamically far superior.

While some of these new frames have greatly improved aerodynamics with their streamlined shapes and efficient configurations, they have the reputation of being heavy, flexible, and/or bouncy, and thus are thought to have greatly reduced riding characteristics compared to traditional steel frames. One reason for this is that some of these frames are, primarily, variants of the open web truss type construction, and employ traditional load bearing engineering principles. In addition, some of these innovative designs sometimes require complicated and costly construction techniques, as well as extensive mechanical adjustments. A superior design should address the aerodynamic efficiency, stiffness, strength, and weight requirements, of a bicycle frame simultaneously.

SUMMARY OF THE INVENTION

Objects of the Invention

In view of the above it is the aim of the present invention to achieve singularly and simultaneously:

the production of a bicycle frame of which the configuration, shape, and arrangement of appropriate parts is inherently suited for aerodynamic efficiency;

the production of a bicycle frame that is extremely strong, stiff and resistant to flex or deflection under applied vertical, lateral, and torsional loads without heavy self weight, and consequently;

the production of a bicycle frame that is very light weight in proportion to its strength, and finally;

the production of a bicycle frame that is simple to construct and easy to assemble. To achieve these ends it was necessary to invent and develop a new load carrying and transferring structural schema, called the integral tension configuration.

The present invention, therefore, discloses a bicycle frame that makes use of said integral tension configuration, and discloses said integral tension configuration itself, and its structural subcomponents, namely an integral tension outer shell, an integral tension strut, and an integral tension rib, wherein the multidirectional tensile strength of said structural subcomponents as well as their arrangement are the primary structural characteristics used to produce the strength and overall stiffness of the structure under applied vertical, lateral, and torsional loads. The coessential structural subcomponents defined as integral tension struts and integral tension ribs are used, wherein the multidirectional tensile strength characteristics of said struts and ribs are the primary load transferring component. The said bicycle frame includes a main frame structure and fork assembly; said main frame structure including an airfoil shaped "down tube" running from a fork mounting means that may be comprised of a head tube sleeve and steer tube combination to a crank assembly mounting means that may be comprised of a bottom bracket sleeve with two streamlined rear wheel stays running from said airfoil shaped down tube at said crank assembly mounting means or bottom bracket area to center of rear wheel, and an airfoil shaped "seat tube" emanating from said airfoil shaped down tube between said tube sleeve and said crank assembly mounting means or said bottom bracket sleeve at a midway point, and employing airfoil shaped gussets at their common joint, and including a bicycle saddle mounting means; and said main frame structure being composed of an aerodynamically shaped outer shell and inner structural members, preferably including, but not limited to, a various number of generally parallel and lineally running integral tension struts along or near the midsection of said airfoil down tube, said rear wheel stays, said airfoil seat tube, that affix along said integral tension struts entire predetermined circumferential edge to the inner surfaces of the said outer aerodynamic shell, and possibly, but not necessarily a various number of integral tension ribs generally perpendicular to the upper and lower of the said generally parallel and lineally running integral tension struts, and bonding to the upper and lower inner surfaces of the said aerodynamic outer shell or said integral tension struts; said inner structural members and surfaces of the said aerodynamic outer shell or said integral struts; said inner structural members and said outer aerodynamic shell, preferably, but not necessarily, made of fiber reinforced composite laminates and arranged for efficient collaboration to carry rider load and resist flex, such as side and torsion flexes, reduce frame weight, and increase strength; said main frame structure also including said fork mounting means, preferably consisting of a head tube sleeve and steer tube combination, said crank assembly mounting means that that may be comprised of bottom bracket sleeve, a bicycle saddle mounting means such as a seat tube sleeve and binder bolt combination, at the top of said airfoil seat tube, and rear wheel mounting means, preferably consisting of rear wheel receptors affixed to interior or exterior of said main frame structure at the end of said rear wheel stays; said fork assembly including a fastening means to said main frame, preferably consisting in a steer tube, headset bearing race support, and may include a fork crown, two front wheel support structures or blades running from said fork crown to the center of front wheel, and front wheel mounting means that may be comprised of receptors which are affixed to the interior or exterior of the end of said fork blades opposite said fork crown, said fork blades being composed of an airfoil shaped outer shell and inner structural members, including, but not limited to a various number of generally vertical and parallel lineally running integral tension struts affixed along said integral tension struts entire circumference to the inner surface of the said outer airfoil shell, and said fork blades permanently affixed to said steer tube and said possible fork crown. Both said main frame and fork are integrally constructed and form structural frame units that are aerodynamically efficient, lightweight, and strong. Other advantages, features, characteristics, and details of the present invention will be apparent from the following description in conjunction with the accompanying drawings, in which like reference numerals designate the same or similar parts.

BRIEF DESCRIPTION OF THE DRAWINGS

FIG. 2A is a perspective view of a half cylindrical shell.

FIG. 2B is the same view of the same half cylindrical shell illustrating wall deflection when a torsional load is applied.

FIG. 2C is the same view of the same half cylindrical shell illustrating the application of an integral tension strut to inhibit torsional load deflection flex.

FIG. 2D is a split perspective view of a thin wall airfoil rube structure illustrating the application of the solution of the integral tension strut in the upper and lower halves of said airfoil tube.

FIG. 3A is a section view of a thin wall airfoil tube.

FIG. 3B is the same section view of the same thin wall airfoil tube illustrating its vertical torsional deflection when opposing loads are applied to its upper and lower ends.

FIG. 3C is the same section view of the same thin wall airfoil tube illustrating the application of an integral tension strut to inhibit vertical torsional load deflection. (FIG. 2D again shows the application of the solution of the integral tension strut principle as used in perpendicular integral tension ribs, and in said "x" section lineally strut to said airfoil tube).

FIG. 4A is a top view of a rectangle.

FIG. 4B is the same top view of the same rectangle illustrating its deflection when side lateral forces are applied at its ends.

FIG. 4C is the same top view of the same rectangle illustrating the application of an integral tension strut to inhibit side lateral load deflection.

FIG. 4D is the same top view of the same rectangle illustrating the application of an integral tension strut to inhibit side lateral load deflection when the load is applied to the midsection of the span. (FIG. 2D again illustrates the application of the solution to lateral load deflection by parallel and lineally running "x" and "l" section integral tension struts to inhibit lateral load deflection in the airfoil structure).

FIG. 5A is a section view of a thin wall airfoil tube illustrating contra posing side deflection of its walls when a vertical load is applied.

FIG. 5B is the same view of the same thin wall airfoil tube illustrating the application of "x" and "l" section integral tension struts to inhibit said contra posing vertical load deflection. (FIG. 2D again shows the solution of the integral tension strut in the upper and lower "l" configuration and in the midsection "x"configuration in the structure.)

FIG. 6 is an exterior side view of the bicycle frame of the present invention illustrating the application of the integral tension strut principal to show the vertical load bearing capabilities of the exterior shell walls.

FIG. 7 is an exterior side view of the main frame structure and fork assembly of the present invention.

FIG. 8 is a top exterior view of the main frame structure and fork assembly of the present invention.

FIG. 9 is a front exterior view of the fork assembly of the present invention.

FIG. 10 is an interior view of a half shell of the fork blade assembly of the present invention along a central common vertical place illustrating a possible and preferred arrangement of inner struts.

FIG. 11 is a side interior view of the lower portion of a fork blade of the present invention illustrating a possible alternative rake adjustable front wheel receptor.

FIG. 12 is a front section view of the upper construction of the fork of the present invention illustrating the arrangement of the steer tube with bearing race support and/or fork crown and the top of the fork blades.

FIG. 13 is a section view of a fork blade assembly of the present invention illustrating a possible and preferred arrangement of molded parts including exterior shells and integral tension struts, and a possible and the preferred method of assembly thereof.

FIG. 15A is a section view of the main frame structure along the airfoil seat tube of the present invention illustrating a possible alternative to the preferred arrangement of integral frame parts, including internal "h" and "l" integral tension struts and ribs and external shells, and a possible alternative to the preferred method of construction and assembly thereof.

FIG. 15B is a section view of the main frame structure along the airfoil seat tube of the present of invention illustrating a possible and the preferred arrangement of integral frame parts, including a "x" and "l" section internal integral tension struts and ribs and external shells, as well as the possible and the preferred construction and assembly method thereof.

FIG. 16A is a section view of a rear wheel stay of the main frame structure of the present invention looking forward and illustrating a possible and the preferred arrangement of integral frame parts, including internal integral tension struts and external shells, and a possible and the preferred method of construction and assembly thereof.

FIG. 16B is a section view of a rear wheel stay of the main frame structure of the present invention illustrating a possible alternative arrangement of integral frame parts, including interior integral tension struts and ribs and exterior shells as well as alternative construction and assembly method thereof.

FIG. 16C is a section view of a rear wheel stay of the main frame structure of the present invention illustrating a possible alternative arrangement of integral frame parts including "x" section interior integral tension strut, ribs and exterior shells, as well as an alternative construction and assembly method thereof.

FIG. 16D is a section view of a rear wheel stay of the main frame structure of the present invention illustrating a possible alternative arrangement of integral shells as well as an alternative construction and assembly method thereof.

FIG. 17 is an interior view of a half shell of an alternative main frame structure schema of the present invention along a central common vertical plane illustrating an alternative arrangement of integral tension struts and ribs wherein the caps illustrated in FIGS. 14, 15A and FIG. 15B are incorporated into the outer shell halves.

FIG. 18A is a section view of the main frame structure along the airfoil seat tube of the present invention illustrating a possible alternative arrangement of "h" section interior integral tension struts and outer shells, the use of molded and/or wet-laminated seam overlays wherein assembly is along said common vertical plane of the two frame halves, and using the possible alternative method of assembly thereof as illustrated and described in FIG. 17.

FIG. 18B is a section view of the main frame structure along the airfoil seat tube of the present invention illustrating a possible alternative arrangement of interior and exterior frame parts employing a "y" and "h" section integral tension strut assembly with outer shells, and the use of molded and/or wet-laminated seam overlays wherein assembly is along said common vertical plane of the two frame halves and utilizing the alternative assembly method described in FIG. 17.

FIG. 19 is an interior side split view of the present invention illustrating a possible and alternative arrangement of interior integral tension struts and ribs and outer shells, and a possible alternative method of assembly thereof, along a central generally horizontal common joint with seam overlays.

FIG. 20A is a section view of the main frame structure of the present invention along the airfoil seat tube illustrating a possible alternative arrangement of interior and exterior frame parts including integral tension struts and exterior shells utilizing the alternative assembly method described in FIG. 19.

FIG. 20B is a section view of the main frame structure of the present invention along the airfoil seat tube illustrating a possible alternative arrangement of interior and exterior frame parts employing an integral tension "Y" strut assembly and outer shells and utilizing the alternative assembly method described in FIG. 19.

FIG. 20C is a section view of the main frame structure of the present invention along the airfoil seat tube illustrating a possible alternative arrangement of interior and exterior frame parts and the possible alternative use of a foam core material, along with integral tension struts and outer shells and utilizing the alternative assembly method described in FIG. 19.

FIG. 20D is a section view of the main frame structure of the present invention along the airfoil seat tube illustrating a possible alternative arrangement of interior and exterior frame parts and possible alternative use of honey comb core material, along with integral tension struts and outer shells and utilizing the possible alternative assembly method described in FIG. 19.

FIG. 21 is a section view of a rear wheel stay of the present invention illustrating a possible alternative arrangement of interior integral tension struts and ribs and exterior shells, and utilizing the alternative assembly method described in FIG. 19.

DETAILED DESCRIPTION OF THE INVENTION

Figure 1A:
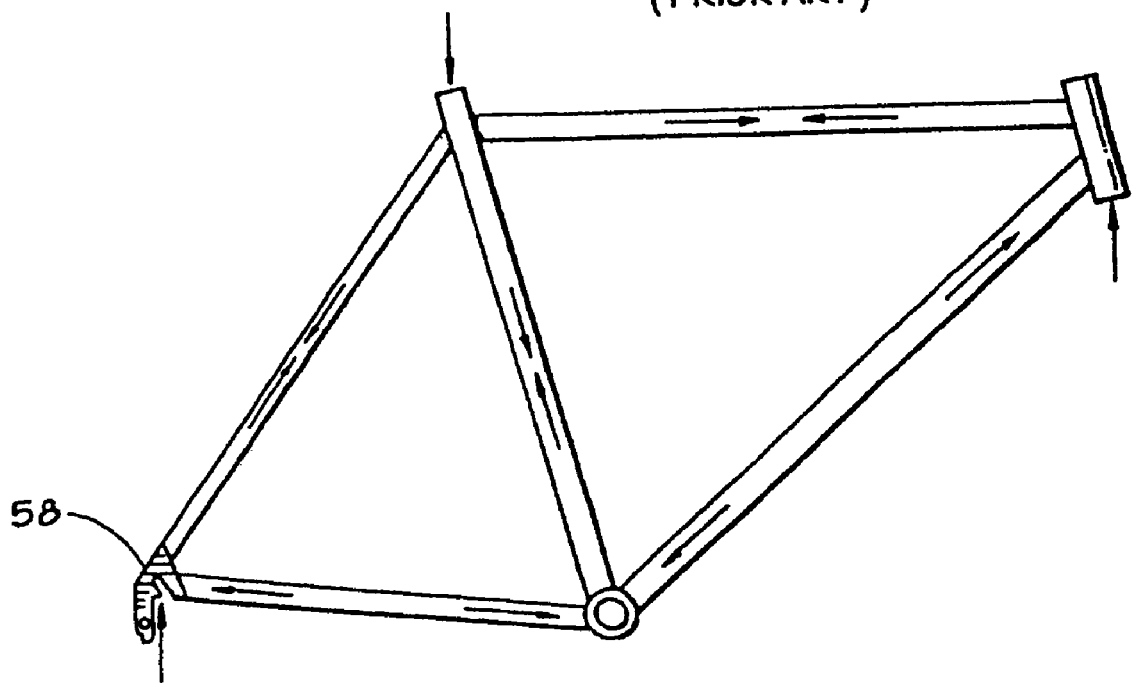
FIG. 1A is a side exterior view of a main frame of a traditional two triangle design bicycle frame. This view illustrates road style rear wheel receptors 58 with a derailleur mount. In this figure, as well as the series of figures that follow, up to and including FIG. 6, solid shaft arrows on the outside of the shapes indicate the force and the direction of the force applied, dashed shaft arrows on the outside of the shape indicate the reactionary contra posing motions, or the tendency to reactionary contra posing motions of the entities to the applied force, including primarily contra posing lineal motions, and solid shaft arrows on the inside of the structures indicate the load types of the members themselves, with arrows point towards each other indicating compression, and narrows pointing away from each other indicating tension.

In order to more fully understand the nature of the integral tension configuration of the present invention, to distinguish it from what is old, and to illustrate its novel arrangement and use of parts, it would be very suitable to begin with a brief but detailed analysis of effects of the various types of loads that are applied to a bicycle frame. To do this, I will, firstly, identify what I think are the frequently occurring load types during the use of a bicycle frame; secondly, showing effects of these loads on simple structural frame shapes; thirdly, by showing the corrective effect of my integral tensile strut when applied to the simple frame structure; and fourthly, by showing the application of the solution to actual aerodynamically shaped structural body parts of the bicycle frame of the present invention.

The first and most obvious load that is applied to a bicycle frame is that of the rider himself. This is a vertical weight load that is borne by the frame structure and transferred to the hubs of the wheels, and through the wheels to the ground. This load can be amplified to a greater or lesser degree when, for example, the rider guides his bicycle over a speed bump at a faster or slower speed. The amount of amplification of the vertical load will depend on the height of the speed bump, the angle of its forward inclined surface, the weight of the rider, and the rate of speed at which he is traveling. It is conceivable that said vertical load can be amplified two or more times.

A second load force that is applied to a bicycle frame is a lateral load in the lower part of the frame from right to left and left to right, as the rider pedals the bicycle. Resistance to deflection to this lateral load is usually the means used to determine how "stiff" a bicycle frame is, and this stiffness is an important consideration in determining how well the bicycle frame will perform overall. In addition to this lower lateral load, there is also an equal opposite counter lateral load at the saddle area of the frame as the rider pedals.

A third, and closely related load to lateral load is a torsional load that occurs, also during the pedaling cycle, as a result of the downward force applied to the pedal in which one end of the crank spindle is forced down during the application of downward force, and the other end is consequently forced up. This concomitant torsional force is also a determining factor in rating the stiffness of a bicycle frame.

The torsional reaction to the application of downward force travels both in a lineal direction as wells as in a vertical direction up the frame members, and because of this there is a possibility of deflection in both directions. In addition, there is also an equal and opposite reaction to the downward force applied to the pedal which is the deflection, or the tendency to deflect of the saddle both in a lateral and in a torsional fashion, when the rider is seated while pedaling, because, as in the case of the bicycle frame of the present invention, the top of the saddle area tends to deflect more than its bottom.

Having thus identified the frequently occurring forces applied to the bicycle frame during its use we will, then, proceed to an examination of the effects of these forces on individual frame parts.

Figure 1B:
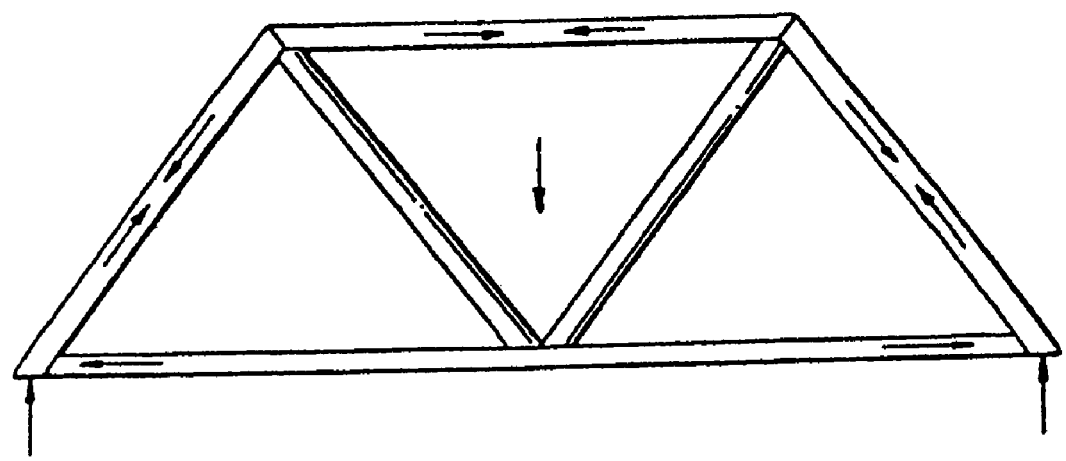
FIG. 1B is a side view of a typical open web truss.

FIG. 1A is a side exterior view of a main frame portion of a bicycle frame to which a vertical load has been applied. The solid shaft arrows on the interior of the objects of both FIGS. 1A and 1B indicate how the load is transferred through the structure and to the ground. Arrows that point away from each other indicate that these frame parts are subjected tension forces, and arrows that point towards each other indicate that these frame parts are subjected to compression forces during load transference. As stated in the background of the invention, the traditional two triangle bicycle frame is basically a very simple and short open web truss, and this similarity, as well as the similarity in load transferring qualities is seen in a comparison between FIG. 1A and FIG. 1B in which the later is a side exterior view of a typical open web truss that is frequently used in bridge construction. In this structural schema, as was stated in the background, a combination of forces are operative, when a vertical load is applied, and these include said compression forces on the top boom of the open web truss that tend to push said upper boom down, and said tension forces in the lower boom that tend to pull in opposite directions along said boom. In addition, there are shear forces between the two that are born by a combination of vertical and/or inclined compression and tension members.

Referring to a bicycle frame, depending on whether the load is on the seat, the pedals, or on both, the seat tube can be subjected to either compression and/or tension forces.

The lateral and torsional loads of the traditional two triangle frame are borne primarily in only the outer walls of the frame tubes, and the bicycle can be made stiffer in increasing the thickness of these walls, by adding rifling to their interiors, by fluting said outer walls, and by increasing the diameter of said tubes. While these changes offer some improvement to the stiffness of the bicycle, none of them simultaneously address this along with the frame weight and aerodynamics. In my opinion, there was still a substantial need to attempt simultaneous solutions to the problems of strength, weight, and aerodynamics without making compromises in any area.

In the development of the bicycle frame of the present invention it was found that all three areas could be addressed simultaneously by means of the integrated tension configuration and the development and use of a coessential frame members, namely the integral tension strut and integral tension rib. It would be appreciated that it be understood that the terms integrated tension design and integrated tension configuration, or integral tension configuration are used synonymously throughout, and that the terms integral tension strut and integral tension rib as well as integral tensile strut and integrated tension strut are also used synonymously throughout, in that their construction is the same or similar, but that they differ in that the integral tension struts will run generally parallel to the longitudinal structural span, and that the integral tension rib will run generally perpendicular to the longitudinal structural span and generally intersect said integral tension struts.

The integral tension strut is, preferably, but not necessarily, made of a fiber reinforced composite laminate in which a combination of bidirectional reinforcing layers, arranged in a 45 degree bias, a 30/50 degree bias, and in a 90 degree lateral and longitudinal configuration, and forms an extremely efficient and lightweight means of load transference when properly attached to the inner surface of the outer shell of a structure and other frame parts with a continuous bond along its entire predetermined circumferential edge.

While there are admittedly some compression bearing capabilities of this thin and lightweight laminate, they were found to be relatively insignificant and hardly operative in the application of the said integral tension strut in comparison to the tensile capabilities thereof. This was borne out by the fact that, when high tensile strength reinforcer was used to manufacture said integral tension strut, like Kevlar synthetic fiber, which has about twice the tensile strength and half the flexural strength of other reinforcing fibers, like graphite, and which is considered to have poor compressive characteristics, it produced a stiffer overall structure when installed into the outer shell, then when a reinforcer that is stiffer and has higher compressive strength but lower tensile strength was used, like graphite or fiberglass.

A fuller understanding of the application of said integral tension configuration and the said integral tension strut to counteract torsional, lateral, and vertical load deflection within the confines of a thin aerodynamic shell can be seen in the series of figures FIGS. 2A and 6, wherein solid shaft arrows on the outside of the structural shapes represent the type of force and the direction of the force applied, and dashed shaft arrows on the outside of said shapes represent the resultant contra posing lineal and torsional movements or the tendency of these movements on the part of said shapes, and arrows on the inside of said shapes indicate the type of loads that occur in correcting said contra posting movements, with arrows that point away from each other indicating tension. It should be understood that the said integral tension struts and said integral tension ribs are shown only with a 45 degree fiber orientation for the purpose of simplifying the drawing for illustrative purposes, and that the more complex multiple ply fiber orientation mentioned above is the preferred laminate schema.

It should also be noted that while the description of the functioning of said integral struts in the series of drawings FIGS. 2A through 2D and 4A through 4D make use of rectangles for the purpose of simplicity of demonstration, and that their shapes are not intended to be limited thereto, and as is shown in the remainder of the present specification the circumferential shape of said integral tension struts and said integral tension ribs may be varied to accommodate the contours of said integral tension outer shell, or to suit the specific demands of a particular application as is demonstrated in the practical application of integral tension ribs adapted circumferential shapes in FIGS. 2D, 3C, 6, 15A, 15B, 19, 20A and 21, and that the cross section of said integral tension struts and said integral struts may likewise be altered to the demands of a specific application as shown in the various cross sections of said integral tension struts in FIGS. 15A and 15B, 16A, and 18B that include but are not limited to cross sections of "H", "I", "U", "X", and "W" shapes.

The following series of descriptions of the drawings will break down the integral tension configuration into its sub components, demonstrate its novel load bearing and load transferring characteristics, show the arrangement of structural sub components, and explain the essential features of the collaboration of said sub components.

Referring initially to the sequence of figures in series 2, a solution to the problem of horizontal torsion load deflection can be seen, wherein:

FIG. 2A is a perspective view of a half section of a cylindrical tube.

FIG. 2B is the same perspective view of the same half section of cylindrical tube when it is subjected to a torsional load, and its subsequent deflection, in which loads and subsequent deflections are indicated by arrows. During torsion load deflection for this type of half shell shape, the opposite walls move in contra posing lineal and rotational directions. This subsequent deflection to a torsional load can be inhibited, if not eliminated, by the addition of a lineal integral tension strut 26, as illustrated in FIG. 2C, that is capable of resisting the shear tendencies of the walls of the shell primarily by its multidirectional tensile strength characteristics and complex fiber orientation. The arrows in said integral tension strut 26 of this figure represent the transference of the applied load into the tensile strength of said strut through the use of contra posing forces. In other words, the tendency of one shell wall to move in the opposite direction of the other, and the force by which it does so, is used to pull or retain the opposite wall in its proper position and vise-versa, through the tensile strength of said integral tension strut 26. By eliminating the ability of the shell walls to move independently of each other, one is able to concomitantly eliminate torsional load deflection or flex. This is an extremely efficient load transferring and stress dispersing system; force and counter force, along with and through very, high tensile strength members, are being use to transfer loads and counteract applied force instead of just the brute compressive strength of heavy vertical and inclined compression oriented members, such as in an open web bridge truss. Because of the inherent efficiency of this structural system major reductions in weight and major improvements in strength can be achieved over other systems. For example, the heavy compression oriented members of an open tress design can be replaced with thin light weight high tension strength members. Both the thickness and the weight of the outer shell of the said integral tension configuration, as well as that of said integral tension struts and said integral tension ribs can be reduced because of their mutual collaboration and codependence. However, because the independent structural integrity of said parts would likely be reduced by the reduction in weight and thickness, it is essential that said integral tension struts have a continual line of contact with said outer shell all along said struts outer circumference, either by structural incorporation or bonding as shown in drawing 2C. Should this continual contact be lacking at any point the outer shell may buckle at that point as the contra posing lineal motions and forces are not able to be transferred and counteracted in the integral tension strut.

It should be further noted that the above-mentioned complex laminate schema that includes fiber orientation of 45 degree bias, a 30/60 degree bias, and a 90 degree lateral longitudinal configuration not only uses motion and counter motion, force and counter force to inhibit load deflection and carry applied loads, but also transfer said forces to a multiplicity of points along the entire circumference of said integral tension struts and said integral tension ribs, so that lateral loads will be transferred and dispersed at various degrees of diagonalization, and also longitudinally and laterally which enables said struts to help retain the relative positions of said outer walls and also to retain the geometric integrity and shape of the structure.

FIG. 2D illustrates the application of this tension strut 26 solution into the airfoil shell of the bicycle frame of the present invention by means of parts number 25, 26, and 18a.

Referring secondarily to the sequence of figures in series 3, a solution to the problem of vertical lateral and vertical torsional load deflection can be seen, wherein:

FIG. 3A is a section view of an airfoil tube shell;

FIG. 3B is the same section view of the same airfoil shell in deflection under vertical later and/or vertical torsional load application. This type of movement can occur, for example, at the saddle area of the airfoil seat tube of the present invention, when a downward force is applied to a pedal, and the reaction to that applied downward force is the application of a lateral force at the saddle area of the airfoil seat tube. While the whole airfoil seat tube tends to deflect laterally, the top portion thereof tends to deflect laterally more than the bottom. Hence, there is a vertical lateral and a vertical torsional load deflection tendency.

FIG. 3C is the same section view of the same airfoil shell illustrating the application of the solution by installing both a perpendicular integral tension rib 27 and a "x" section lineal integral tension strut 18a to inhibit vertical lateral and torsional load deflection.

FIG. 2D again illustrates the application of this solution of perpendicular integral tension ribs 27 and "x" section lineal integral tension strut 18a to the airfoil shell of the bicycle frame of the present invention.

Referring thirdly to the sequence of figures in series 4 a solution, very similar to that of the torsion load deflection problem of the 2 series, is offered for the problem of lateral endspan and midspan load deflection, wherein:

FIG. 4A is a top view of a rectangle, and may be taken to represent a top view of a half cylindrical shell;

FIG. 4B is the same top view of the same rectangle illustrating the deflection thereof under the application of lateral loads at its ends;

FIG. 4C is the same top view of the same rectangle illustrating the application of the solution of a lineal integral tension strut 26 to inhibit lateral endspan load deflection;

FIG. 4D is the same top view of the same rectangle illustrating the application of the solution of a lineal integral tension strut 26 to inhibit lateral midspan load deflection. This solution to midspan lateral load deflection can be more clearly understood by thinking of the point of the midspan lateral load application as a common point of lateral load application on two span lengths butted together.

FIG. 2D again illustrates the application of this solution of a combination of lineal "l" and "x" section integral tension struts to the airfoil shell structure of the bicycle frame of the present invention by means of parts number 25, 26, and 18a respectively.

Referring fourthly to the sequence of figures in series 5 a solution to the problem of vertical load deflection is seen, wherein:

FIG. 5A is a section view of an airfoil tube with arrows to illustrate an application of vertical load, and consequent outward deflection of the side walls thereof;

FIG. 5B is the same section view of the same airfoil seat tube illustrating the application of the solution of combination of "l" and "x" section lineal integral tension struts to inhibit the outward deflection of said side walls under a vertical load. It should be understood that the integral tension ribs number 27, also assist in resisting vertical load deflection. Again, the application of this solution of integral tension struts to the airfoil shell structure of the bicycle frame of the present invention is seen in FIG. 2D by means of parts number 25, 26, and 18a.

A close examination of FIG. 2D will make it obvious that said integral tension struts are independently thin and flexible, but that, when arranged in the integrated interdependency of the integrated tension configuration of the present invention, they form an extremely efficient load transferring system. It will also be apparent that the solutions are multi functional and are used to resist multiple and diverse toads and load deflections. This is elemental to the integral tension design.

It should be understood, however, that the said integral tension components, i.e., said integral tension outer shell, said integral tension struts, and said integral tension ribs, can also be made of a material of higher compression strength, and with a higher flexural strength, for example, by adding layers to the laminate; by using a reinforcing fiber of higher compressive and flexural modulus strength characteristics, such as carbon fiber or fiberglass, and by increasing the quantity of fiber and matrix. Such changes will add compressive strength and flexural strength to said integral tension shell, said integral tension struts and ribs and increase their independent strength characteristics, but will also add weight to the entire structure as well as to the individual components. But unless there are increases in the tensile strength of said components, such changes may not necessarily be advantageous from the standpoint of weight and performance.

FIG. 6 is a side exterior view of the present bicycle frame of the present invention with arrows to illustrate the overall structural schema of the outer shells of said bicycle frame of the present invention and to illustrate the application of the integral tensile configuration and strut principal in the design and construction of the outer vertical load bearing shells, wherein the arrows indicate the direction of the applied vertical load as well as the tendency to contra posing lineal movements of the upper and lower parts of said frame, as well as the direction of load transference. The said integral tension outer shell also serves the obvious function of retaining said integral tension struts and integral tension ribs in their predetermined relative positions. The said integral tension outer shell is constructed of a high multidirectional tensile strength material, such as a fiber reinforced composite laminae, with the complex fiber orientation schema mentioned above, and utilizes the same basic principles of said integral tension struts.

Since the novel structural engineering of said integrated tension configuration, and said integral tension strut and said integral tension rib as employed in solving the problems of load deflection of the individual parts of said bicycle frame of the present invention, has been shown, the integrated arrangement, construction, and assembly of said integral tension parts thereof will now be treated.

Referring, therefore, initially to FIG. 7 the aerodynamically shaped bicycle frame, of the present invention is shown, including a main frame structure 1 and fork assembly 2, from an exterior side perspective. FIG. 8 shows the same from an exterior top perspective. The design configuration of said main frame structure is comprised of a main drive train structure which includes an elongated airfoil shaped down tube structure 3 running from front fork mounting means that may be comprised of a head tube sleeve 4 (not visible in the present exterior view but the location of which is indicated), through a crank assembly mounting means that may comprise a bottom bracket sleeve 5 with two streamlined rear wheel stays 6 running from said bottom bracket sleeve area to center of rear wheel, and an elongated airfoil shaped seat tube 7 emanating from said airfoil shaped down tube 3 of said main drive train structure, between the head tube 4 and the bottom bracket sleeve 5.

Said main frame structure also employs a bicycle saddle mounting means that may comprise a seat tube sleeve 9 at the top of said airfoil seat tube 7, or may comprise some other saddle mounting mechanism, and a rear wheel mounting means that may comprise two rear wheel receptors 8, here shown in the track configuration to receive a fixed gear wheel, but which can use an alternative road configuration to receive a road wheel with a free wheel gear cluster, and gear shifting mechanisms (not shown), and are employed at the end of the rear wheel 6. It would be appreciated that it be understood that while the invention is shown in a "track" configuration, that the same frame can be given a "road" configuration, wherein it is adopted to receive a front and rear break, front and rear derailleurs, shifter controls, and shifting and break cables, and an assembly of multiple crank chain wheels, and a rear wheel free floating gear cluster, and that such an adaptation is considered to be within the scope of the present invention. FIG. 1A shows an example of a road style rear wheel receptor 5B with a derailleur mount. FIG. 7 also illustrates front wheel mounting means that may consist of front wheel receptors 15. Airfoil shaped gussets 10 and 11 are also used at the common joint of said airfoil seat tube 7 and said airfoil shaped down tube 3 to increase strength and stability.

FIG. 7 and FIG. 8 together show the general over all appearance as well as the aesthetic, aerodynamic, and exterior structural features of the outer shell of this particular preferred design embodiment, but the scope of the invention is not limited thereto, and other design embodiments may be substituted. In addition, FIG. 8 shows a top view of the inner rear wheel stay shell molding 16.

FIG. 7 also illustrates an exterior side view of said front fork assembly 2 that employs a steer tube sleeve and steer tube combination mounting means when installed in its proper position in said head tube 4 of said main frame structure 1. FIG. 8 identifies the two front wheel support structures or fork blades 14, front wheel receptors 15, and steer tube 17 of said front fork assembly 2 when installed in its proper position in said main frame structure 1 from a top exterior perspective. Also shown in FIG. 7 is the longitudinal axis 100 of the seat tube sleeve, the longitudinal axis 101 of the seat tube and the longitudinal axis 102 of the down tube.

FIG. 9 is a front exterior view of the fork assembly as shown when disassembled from said main frame structure 1. This view more clearly shows the arrangement of the individual parts thereof, including said steer tube 17, a headset bearing race support 12, and/or fork crown 13, said fork blades 14, and said front wheel receptors 15. The amount of rake in said fork blades may be varied to achieve desired geometry and ride characteristics, by either molding the desired rake into said blades during construction, or by changing the position of the axle slots in said front wheel receptors. This specification discloses the possibility of accommodating fork rake by making variable positions in the slots of said receptors.

FIG. 10 illustrates said fork assembly 2 as shown when disassembled from said main frame structure 1 from an interior side perspective. Said fork blades 14 preferably, but not necessarily employ interior generally vertical and parallel running struts 38, as illustrated, and they may also employ a combination of integral tension struts, ribs, and other suitable core materials. Both said front wheel receptors 15 and said fork crown 13 may employ holes, or some other similar feature, to facilitate bonding to said fork blades 14, as illustrated.

FIG. 11 illustrates the lower portion of said fork assembly 2 of the present invention from an interior side perspective showing a variable front wheel receptor 15a, which provides the bicycle with fork rake adjustments for different steering geometries.

FIG. 12 is an enlarged front section view of the construction of the upper portion of said fork assembly 2 of the present invention that more fully illustrates the junction of said steering tube 17 and fork crown 13 with said fork blades 14, and shows in more detail the individual parts thereof, including said steer tube 17, headset bearing race support 12 and/or fork crown 13, shell molding 36, shell moldings 37, and 37a, and integral tension struts 38.

The preferred manner of making said fork assembly 2 of the present invention is illustrated more dearly in FIG. 13 wherein said fork blade 14 including said shell moldings 36 and 38, integral tension struts 38, and caps or seam overlays 40 and 41 are shown by way of a section view. In the preferred construction and assembly schema of the front fork assembly 2, said headset race support 12 and/or said fork crown 13, are preferably but not necessarily made of steel and are brazed and/or bonded and/or fastened by other suitable means to said steer tube 17, which is also made of steel. Said fork blade structures 14 are made, preferably, but not necessarily, of fiber reinforced composite laminate materials, including, but not limited to, a suitable plastic resin such as epoxy, and carbon fiber, and/or Kevlar synthetic fiber, and/or fiberglass, and may include a suitable core material like honey comb, and/or foam core, and any variable combination of these and/or other fiber reinforced composite and/or core materials and/or other plastic systems, and may also be made of metal, or any combination of these and any other suitable material, and is preferably, but not necessarily, composed of molded parts that are bonded to outside and inside of said steer tube and fork crown assembly and to one another along a common generally vertical central plane 42 by means of epoxy resin, and/or fiber reinforced composite lamination, and/or other suitable structural and/or industrial adhesive, and/or bonding method, and/ or any other suitable fastening means, or any combination thereof, with the front wheel receptors also being bonded and/or fastened in place with the same or similar processes. It should be noted that, as stated, said steer tube, said fork crown, and said bearing race support, and said front wheel receptors may be made of another suitable material, such as injection molded plastics or fiber reinforced composites, in which case said fork blades and fiber composite fork crown may be bonded to inside and outside of said steer tube, or may be parts of a continuous molding of the same or similar material with said steer tube, said headset bearing race support, and said fork crown.

Figure 14:
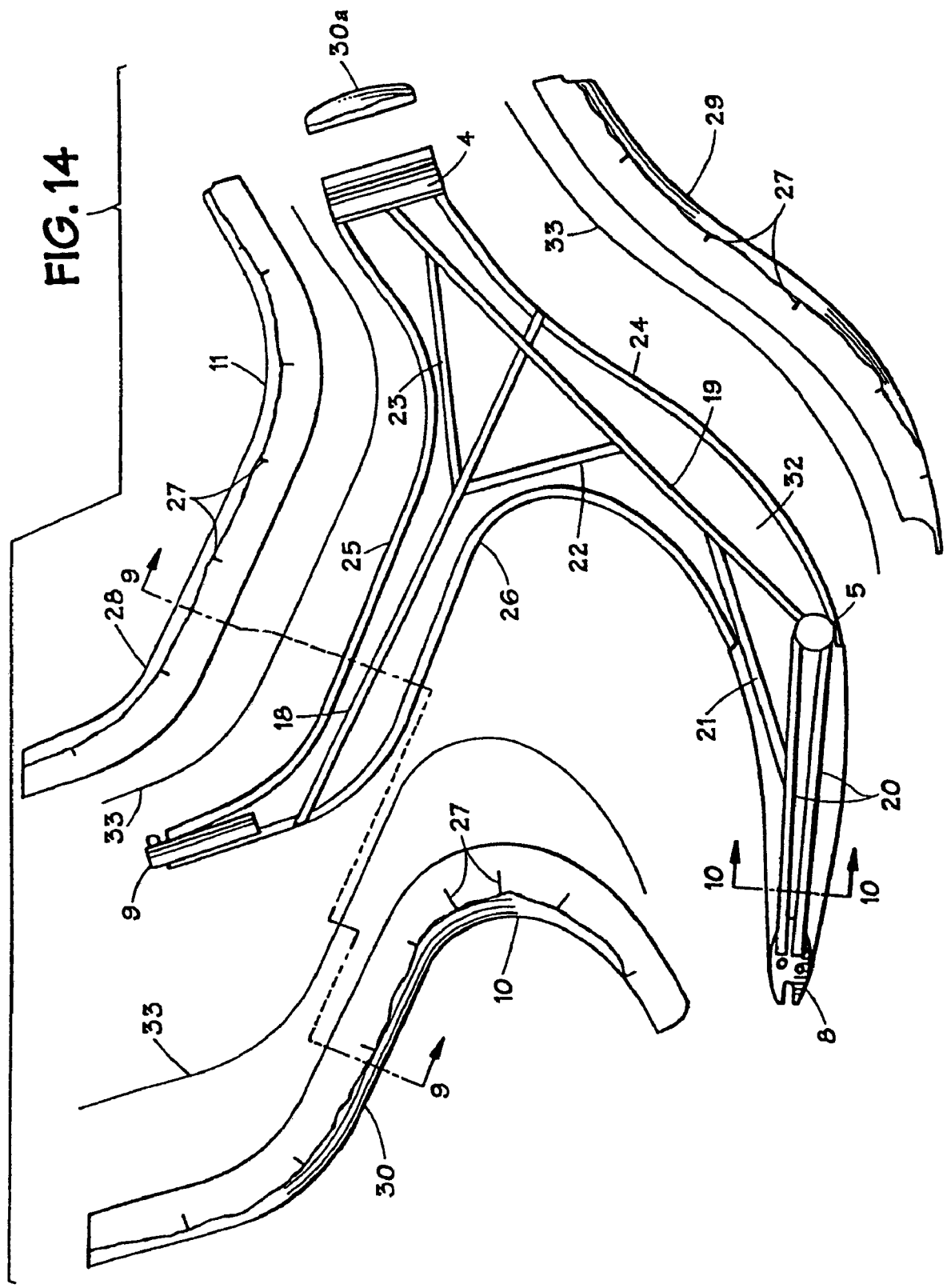
FIG. 14 is a side interior view of the main frame structure of the present invention along a central common vertical plane illustrating a possible and preferred arrangement and construction schema of said integral tension inner struts and ribs, seam overlays, outer shells and structural caps.

FIG. 14 is an interior view of said main frame structure 1 of the present invention wherein said main frame structure 1 is composed of an integral aerodynamically shaped outer shell included in shell halves 31 and 32 of FIG. 15 outer rear wheel stay shells 35 and 35a of FIGS. 16A and 16B, and inner shell 16, also of FIG. 16A, with their integral tension half struts 24, 25, and 26, and in caps 28, 29, 30 and 30a (said parts 16, 31, 35 and 35a not shown or identified in this figure), wherein it would be appreciated that it be understood that said outer shells also incorporate said integral tension design principle and that the term outer shells is also uses synonymously throughout with the term integral tension outer shell; and inner structural members, preferably including, but not limited to, a various number of generally parallel and lineally running integral tension struts including said outer integral half struts 24, 25, and 26 and seam overlays 33, as well as internal integral tension half struts 18, 19, and 20, along or near the midsection of the said airfoil shaped down tube 3, said streamline rear wheel stays 6, and said airfoil seat tube 7, that bond and/or fasten to the inner surfaces of said outer aerodynamic shell, and additional integral tension substruts 21, 22, and 23 joining said struts 20, and 19, 19 and 18, and 18 and 19, near said bottom bracket sleeve 5, rear gusset 11, and top gusset 10 respectively, that also bond to the inner surfaces of the said outer aerodynamic shell, and a possible various number of integral tension ribs 27 generally perpendicular to the said struts 24, 25, and 26, and bonding to the inner surfaces of said caps 28, 29, 30, and 30a, as well as to the surfaces of said seam overlays 33.

The said inner structural members and said outer aerodynamic shell are preferably made of fiber reinforced composite laminate materials, including but not limited to a suitable plastic resin such as epoxy, and a fiber reinforcer such as carbon fiber, and/or Kevlar synthetic fiber, and/or fiber glass, and may include a suitable core material like honey comb, and/or foam core, used with said integral tension struts, and any variable combination of these and/or other fiber reinforced composites and/or core materials and/or other plastic systems, and may also be made of metal, and any combination of these and any other suitable material, and are bonded and/or fastened together by means of epoxy resin, and/or industrial adhesive, and/or bonding method, and/or any other suitable fastening means, or any combination thereof.

FIG. 14 also shows the other frame components including said head tube sleeve 4, said bottom bracket sleeve 5, said seat tube sleeve 9, and said rear wheel receptors 8, which, when installed, their arrangements may also serve a structurally interdependent role as well as their specific various practical functions, e.g., the said bottom bracket sleeve 5 may be affixed and/or bonded to the inner surface of the lower pan of said outer shell to form a continuous running power transferring drive train running from said head tube sleeve 4, to rear wheel receptors 8, and may be made of materials including but not limited to metal, and/or high density plastics, and/or fiber reinforced composite material, and/or any combination of these and other suitable materials, and are preferably, but not necessarily, permanently affixed to the interior of said main frame structure 1 at their predetermined respective locations, as well as to said inner integral tension parts and, if appropriate, may also be affixed to the exterior of said main frame 1, preferably, by means of epoxy resin, and/or fiber reinforced composite lamination, and/or other suitable structural and/or industrial adhesive, and/or bonding method, and/ or any other suitable fastening means, structural incorporation, continuous molding, or any combination thereof.

FIG. 15A is a section view of said main frame structure 1 described in FIG. 14 along said airfoil seat tube 7 of the present invention, but may be taken to represent said airfoil down tube 3 also, and illustrates an alternative arrangement to the preferred method of making the invention as described in FIG. 15B and includes outer aerodynamic shell parts 31 and 32, interior integral tension half struts $18_1$, and $18_2$, integral tension mating half struts 25 and 26, seam overlays 33, and caps 28 and 30 with their integral ribs 27.

FIG. 15B is a section view of said main frame structure 1 described in FIG. 14 along said airfoil seat tube 7 of the present invention, but may be taken to represent said airfoil down tube 3 also, and illustrates the preferred arrangement of interior and exterior frame parts, as well as the preferred manner of making the invention.

In this preferred schema the outer shell body and inner structural members are integrally composed of separate molded parts that include upper, lower, back and head molded caps 28, 29, 30, and 30a, with their integrally molded tension ribs 27, two molded outer shell halves 31a and 32a with their integral tension telescopic half struts 18.sub.a 1 and 18.sub.a 2. Said integral tension struts 18.sub.a 1 and 18.sub.a 2 and integral tension fibs 27 may be premolded, and/or laminated in place. The said separate molded parts are made, preferably, but not necessarily, of fiber reinforced composite laminate materials in separate molds, including, but not limited to, a suitable plastic resin such as epoxy, and a fiber reinforcer such as carbon fiber, and/or Kevlar synthetic fiber, and/or fiber glass, and may include a suitable core material like honey comb, and/or foam core, and any variable combination of these and/or other fiber reinforced composites and/or core materials and/or other plastic systems, and may also be made of metal, or any combination of these and any other suitable material, and are bonded and/or fastened together along with said head tube sleeve, 4, said bottom bracket sleeve 5, said seat tube sleeve 9, and said rear wheel receptors 8 by means of epoxy resin, and/or fiber reinforced composite laminate, and/ or other suitable structural and/or industrial adhesive, and/or bonding method, and/or any other suitable fastening means, and any combination thereof.

The preferred construction and assembly schema of said rear wheel stays 6 of said main frame structure 1 is shown by means of FIG. 16A, which is a section view of said right rear wheel stay 6 of the present invention looking forward wherein both right and left wheel stays 6 are formed from separate molded parts, and made, preferably, but not necessarily, of fiber reinforced composite laminate materials in separate molds, including, but not limited to, a suitable plastic resin such as epoxy, and carbon fiber, and/or Kevlar synthetic fiber, and/or fiber glass, and may include a suitable core material like honey comb, and/or foam core, and any variable combination of these and/or other fiber reinforced composites and/ or core materials and/or other plastic system and may also be made of metal, or any combination of these and any other suitable materials, and bonded together with epoxy resin, and/or fiber reinforced composite lamination, and/or other suitable structural and/or industrial adhesive, and/or bonding method, and/or any other suitable fastening means, and any combination thereof. Said rear wheel stay outer shell 35 is the right side continuation of said shell half 31 of said airfoil down tube 3 of said main frame structure 1 and is molded in the same process, wherein said integral tension telescopic bottom and back half struts 24a and 26a continue to the rear wheel receptor 8 but transfer to said outer shell near the bottom bracket area to form the upper and lower surfaces of the said outer shells 35 and 16 of said rear wheel stays. The preferred schema for said rear wheel stay also includes two generally parallel and lineally running dual integral tension struts 20.

FIG. 16B is a section view of said right rear wheel stay 6 of the present invention looking forward that illustrates a variation or modification of FIG. 16A to be utilized, preferably, with main frame structure schema of FIG. 15B, wherein rear wheel stay outer shell molding 35a is a continuation of right side shell molding 31a of said main frame structure 1 wherein rear wheel stay outer shell moldings include integral tension telescopic upper and lower strut halves 26a and 24a that are a continuation of said back and lower integral tension telescopic strut halves 26a and 24a of said airfoil down tube 3 of the schema of FIG. 15B, and wherein said bottom and back caps 29 and 30, with their possible integral tension ribs 27 continue from the lower and back caps of said airfoil down tube 3 of said main frame structure 1 over the entire length of said rear wheel stays 6. Said dual inner integral tension struts 20 of said rear wheel stays 6 are reduced in number, in this schema, from the two sets used in FIG. 16A to one set 20a for the present schema, and said shell moldings 16 and 35 are varied slightly to shapes 16a and 35a. All other construction and assembly methods remain the same or similar.

FIG. 16C is a section view of said right rear wheel stay 6 of the present invention looking forward that illustrates a further variation or modification of FIG. 16A to be utilized preferably, with main frame structure schema of FIG. 15A wherein outer shell 35b is a continuation of said outer shell 31 of said airfoil down tube 3, and wherein said upper and lower integral tension strut halves 26 and 24, respectively, employ mutual facing or mating bonding and/or fastening surfaces in place of said telescopic bonding and/or fastening surfaces of FIG.

16B, and are continuations of back and lower fight side mating integral tension half struts 26 and 24 of said airfoil down tube 3 of main frame structure 1, wherein said shell moldings 16 as well as 35 are varied slightly to 16b and 35b to accommodate said upper and lower caps 29 and 30 with their possible integral tension ribs 27, and wherein said seam overlays 33 continue from said back and lower integral tension mating strut halves 26 and 24 of said airfoil down tube 3 of said main frame structure 1 and fasten and/or bond over their common seam, wherein said caps 29 and 30 are continuations Of said lower and back caps of said airfoil down tube 3 of said main frame structure 1, and wherein said dual inner integral tension struts 20 of FIG. 16A of said rear wheel stays are reduced in number to one set and varied to employ mutual facing or mating integral tension half struts 20b1, and 20b2. All other construction and assembly methods remain the same or similar.

FIG. 16D is a section view of said right rear wheel support structure 6 of the present invention looking forward that illustrates another further variation or modification of FIG. 16A to be utilized preferably, with main frame structure schema of FIG. 18A, wherein said outer shell half 31c is a continuation of said outer shell half 31 of said airfoil down tube 3, and wherein said integral tension upper and lower struts and interior integral tension strut configurations of FIGS. 16B and 16C are replaced with two sets of dual parallel and lineally running mutually facing or mating integral tension struts $20_c1$ and $20_c2$ and wherein shell moldings 35 and 16 are varied slightly to 31c and 16c and share the same common central plane of assembly as do said dual integral tension struts $20_c1$ and $20_c2$, and utilize seam overlays 47c and 48c over their common seams. All other construction and assembly methods remain the same or similar.

FIG. 17 is a side interior view of said main frame structure 1 of the present invention illustrating an alternative arrangement of struts and ribs, and an alternative method of assembly along a central common vertical plane, wherein said top, back, and bottom caps 28, 29, 30 of FIG. 14, or the preferred method, are integrated into the left and fight outer shell moldings 43 and 44, and upper and lower integral tension struts 24, 25, and 26 of FIG. 14, or the preferred method, are replaced with two dual mutual facing and mating integral tension half struts 45 and 45a, and employ either molded and/or wet laminated seam overlays 47 and 48 installed over their common seam. (Parts 43, 45a, 47, and 48 are illustrated in FIG. 18A). Also shown in FIG. 17 are upper and lower elongated down tube members 46. Integral tension ribs 27 may be reduced in number and varied in arrangement. Head cap 30a of FIG. 14 or of the preferred method, may be either incorporated into said outer shell halves 43 and 44, or be molded and installed separately. All other construction and assembly methods remain the same or similar to the preferred method.

FIG. 18A is a section view of said main frame structure 1 of the present invention along said airfoil seat tube 7 that further illustrates the arrangement of interior and exterior frame parts of FIG. 17 as well as the method of construction and assembly thereof and which can also be taken to illustrate said airfoil down tube 3. A similar arrangement may also be used for said rear wheel stays 6, as well as for said fork blades 14. All other construction and assembly methods remain the some or similar to the preferred method.

FIG. 18B is a section view of said main frame structure 1 of the present invention along said airfoil seat tube 7, that illustrates a further alternative arrangement of interior and exterior frame parts employing an integral "y" integral tension strut assembly 52 and utilizing the alternative construction and assembly method described in FIG. 17. This section view may also be taken to illustrate said airfoil down tube 3. The same or similar arrangement may also be employed in said rear wheel support structures 6, and said front fork blades 14. In this schema, said upper and lower generally parallel lineally running integral tension struts 24, 25, 26, and possibly, but not necessarily 20, all of FIG. 14, or of the preferred method, are replaced with an integral lineally running integral tension "y" shaped strut 52, and one set of dual parallel integral tension strut halves 45 and 45a. All other construction and assembly methods remain the same or similar to those of FIG. 18A, and of the preferred method.

FIG. 19 is an interior split side view of said main frame structure 1 of the present invention illustrating a further possible alternative arrangement of interior struts and ribs as well as a possible alternative method of construction and assembly thereof, therein said left and fight integral shell halves 31 and 32, as well as said caps 28, 29, 30 and 30a of the preferred method of construction are incorporated into inner shell half 49 and outer shell half 50, when view from a frontal perspective, that are joined along a central generally horizontal common joint with either wet lamination or premolded seam overlays 51 (not shown in FIG. 19) installed, and wherein said upper and lower inner integral tension struts 24, 25, 26, 18, 19, and 20 of the preferred method of construction are replaced with dual generally horizontal parallel and lineally running integral tension struts 55, 56, and 57, and wherein said integral tension ribs 27 are varied in number and arrangement. All other construction and assembly methods may remain the same or similar to those of FIGS. 17 and 18A and/or of the preferred method.

FIG. 20A is a section view of said main frame structure 1 of the present invention along said airfoil seat tube 7, wherein the construction and assembly method of FIG. 19 is used, showing said inner shell half 49 and said outer shell half 50, with said inner integral tension struts 55 and ribs 27 joined together at their central common generally horizontal seam, and said molded and/or wet laminated seam overlays 51. The same and/or a similar process and/or arrangement may also be used in the construction of said airfoil down tube 3, said rear wheel stays 6, and said front fork blades 14. All other construction and assembly methods may remain the same or similar to those of the preferred mode of making the present invention.

FIG. 20B is a section view of said main frame structure 1 of the present invention along said airfoil seat tube 7, illustrating an alternative arrangement of inner and outer frame members, utilizing a pair of "y" shaped lineally running integral tension struts 52, and assembled in the horizontal plane schema of FIG. 19 with said molded and/or wet laminated seam overlays 51. The same and/or a similar process and/or arrangement may be used in the construction of said airfoil down tube 3, said rear wheel stays 6, and said front fork blades 14. All other construction and assembly methods may remain the same or similar to those of the preferred mode of making the present invention.

FIG. 20C is a section view of said main frame structure 1 of the present invention along said airfoil seat tube 7, illustrating an alternative construction method using a foam core 53 in conjunction with said integral tension struts 55 and with or without integral tension ribs 27 and utilizing the assembly schema of FIG. 19. The same and/or a similar process and/or arrangement may be used in the construction of said airfoil down tube 3, said rear wheel stays 6, and said front fork blades 14. All other construction and assembly methods may remain the same or similar to those of the preferred mode of making the present invention.

FIG. 20D is a section view of said main frame structure 1 of the present invention along said airfoil seat tube 7, illustrating an alternative construction method using a honey comb core material 54 in conjunction with said integral tension struts 55 and with or without integral tension ribs 27 and utilizing the assembly schema of FIG. 19. The same and/or a similar process and/or arrangement may be used in the construction of said airfoil down tube 3, said rear wheel stays 6, and said front fork blades 14. All other construction and assembly methods may remain the same or similar to those of the preferred mode of making the present invention.

FIG. 21 is a section view of said rear wheel stays 6 of the present invention looking forward and illustrating a possible alternative arrangement of said interior integral tension strut 57 and said integral tension ribs 27 and said exterior inner shell half 49 and said outer shell half 50, and utilizing the alternative assembly method described in FIG. 19. Alternative materials such as foam core 53 and honeycomb core 54, may also be used in the construction of said rear wheel stay 6, with or without ribs 27. The same or a similar process may also be used in the construction of said front fork blades 14. All other construction and assembly methods may remain the same or similar to those of the preferred mode of making the invention.

The said integral tension configuration of said bicycle frame of the present invention that optimizes primarily the tensile, but also the shear and compressive strength characteristics of its individual parts through a unique and novel structurally interdependent arrangement, said continuous bonding and/or affixing of said inner structural members, said components, and said outer aerodynamic shell, for the purpose of extremely efficient collaboration to carry rider load, and resist the static and amplified vertical load deflection flex, as well as lateral, and torsional flexes, as well as said integral tension struts and ribs, and considered to be coessential to the present invention.

However, it would be appreciated that it be understood that the said integrated tension configuration itself as well as the said integral tension struts and ribs themselves, and/or the use thereof, as well as said arrangement of said structural members, said components, and said outer shell, their said production and said assembly of the said bicycle frame of the present invention, and any combination of construction and assembly methods utilizing said integral tension struts and ribs design, as exemplified in the above detailed description of the present invention, as well as any variation, alteration, adaptation, and/or modification of the same, and/or other suitable production process that may appear to someone skilled in the art and/or related arts, as well as various applications thereof and which are not limited thereto, are considered to be within the scope of the present invention, as are delineated in the following claims:

What is claimed is:

1. A bicycle frame comprising:
a bottom bracket sleeve;
a front fork assembly mounting means;
an elongated down tube member having a first end disposed adjacent the front fork assembly mounting means, a second end disposed adjacent the bottom bracket sleeve, upper and lower outer surfaces, and a longitudinal axis disposed substantially between the upper and lower outer surfaces;
a seat tube sleeve having an upper end, a lower end and a longitudinal axis extending through the upper end and the lower end of the seat tube sleeve; and
an elongated seat tube having a first end disposed adjacent the seat tube sleeve, a second end disposed adjacent the elongated down tube member, upper and lower outer surfaces, and a longitudinal axis disposed substantially between the upper and lower outer surfaces, the longitudinal axis of the elongated seat tube non-collinear with the longitudinal axis of the seat tube sleeve and the longitudinal axis of the elongated seat tube intersecting the longitudinal axis of the elongated down tube member at a location substantially intermediate between the first and second ends of the elongated down tube member and at a point closer to the first end of the elongated down tube than to the second end of the elongated down tube.

2. The bicycle frame of claim 1 wherein the longitudinal axis of the elongated seat tube intersects the longitudinal axis of the seat tube sleeve.

3. The bicycle frame of claim 1 wherein the longitudinal axis of the seat tube sleeve intersects the longitudinal axis of the elongated down tube member at a location between the bottom bracket sleeve and the front fork assembly mounting means, inclusive.

4. The bicycle frame of claim 1 wherein the longitudinal axis of the elongated seat tube sleeve does not intersect the bottom bracket sleeve.

5. A bicycle frame comprising:
a bottom bracket sleeve;
a front fork assembly mounting means;
upper and lower elongated down tube members, at least one of the elongated down tube members having a first end disposed adjacent the front fork assembly mounting means, a second end disposed adjacent the bottom bracket sleeve, upper and lower outer surfaces, and a longitudinal axis disposed substantially between the upper and lower outer surfaces;
a seat tube sleeve having an upper end, a lower end and a longitudinal axis extending through the upper end and the lower end of the seat tube sleeve; and
an elongated seat tube having a first end disposed adjacent the seat tube sleeve, a second end disposed adjacent at least one of the elongated down tube members, upper and lower outer surfaces, and a longitudinal axis disposed substantially between the upper and lower outer surfaces, the longitudinal axis of the elongated seat tube non-collinear with the longitudinal axis of the seat tube sleeve and the longitudinal axis of the elongated seat tube intersecting the longitudinal axis of at least one of the elongated down tube members at a location substantially intermediate between the first and second ends of the at least one of the elongated down tube members.

6. The bicycle frame of claim 5 wherein the upper and lower elongated down tube members are enclosed within an elongated down tube.

7. The bicycle frame of claim 5 wherein the longitudinal axis of the elongated seat tube intersects the longitudinal axis of the seat tube sleeve.

8. The bicycle frame of claim 5 wherein the longitudinal axis of the elongated seat tube sleeve does not intersect the bottom bracket sleeve.

9. The bicycle frame of claim 5 wherein the longitudinal axis of the elongated seat tube intersects the longitudinal axis of the upper elongated down tube member at a point closer to the first end of the upper elongated down tube member than to the second end of the upper elongated down tube member.

10. The bicycle frame of claim 5 wherein the longitudinal axis of the elongated seat tube intersects the longitudinal axis of the upper elongated down tube member at a location substantially intermediate between the first and second ends of the upper elongated down tube member.

11. A bicycle comprising:
a crank assembly;
a front fork assembly;
front and rear tires;
means for braking the front and rear tires;
a bottom bracket sleeve;
a front fork assembly mounting means;
an elongated down tube member having a first end disposed adjacent the front fork assembly mounting means, a second end disposed adjacent the bottom bracket sleeve, upper and lower outer surfaces, and a longitudinal axis disposed substantially between the upper and lower outer surfaces;
a seat tube sleeve having an upper end, a lower end and a longitudinal axis extending through the upper end and the lower end of the seat tube sleeve; and
an elongated seat tube having a first end disposed adjacent the seat tube sleeve, a second end disposed adjacent the elongated down tube member, upper and lower outer surfaces, and a longitudinal axis disposed substantially between the upper and lower outer surfaces, the longitudinal axis of the elongated seat tube non-collinear with the longitudinal axis of the seat tube sleeve and the longitudinal axis of the elongated seat tube intersecting the longitudinal axis of the elongated down tube member at a location substantially intermediate between the first and second ends of the elongated down tube member and at a point closer to the first end of the elongated down tube than to the second end of the elongated down tube.

12. The bicycle of claim 11 wherein the longitudinal axis of the elongated seat tube intersects the longitudinal axis of the seat tube sleeve.

13. The bicycle of claim 11 wherein the longitudinal axis of the seat tube sleeve intersects the longitudinal axis of the elongated down tube member at a location between the bottom bracket sleeve and the front fork assembly mounting means, inclusive.

14. The bicycle of claim 11 wherein the longitudinal axis of the elongated seat tube sleeve does not intersect the bottom bracket sleeve.

15. A bicycle comprising:
a crank assembly;
a front fork assembly;
front and rear tires;
means for braking the front and rear tires;
a bottom bracket sleeve;
a front fork assembly mounting means;
upper and lower elongated down tube members, at least one of the elongated down tube members having a first end disposed adjacent the front fork assembly mounting means, a second end disposed adjacent the bottom bracket sleeve, upper and lower outer surfaces, and a longitudinal axis disposed substantially between the upper and lower outer surfaces;
a seat tube sleeve having an upper end, a lower end and a longitudinal axis extending through the upper end and the lower end of the seat tube sleeve; and
an elongated seat tube having a first end disposed adjacent the seat tube sleeve, a second end disposed adjacent at least one of the elongated down tube members, upper and lower outer surfaces, and a longitudinal axis disposed substantially between the upper and lower outer surfaces, the longitudinal axis of the elongated seat tube non-collinear with the longitudinal axis of the seat tube sleeve and the longitudinal axis of the elongated seat tube intersecting the longitudinal axis of at least one of the elongated down tube members at a location substantially intermediate between the first and second ends of the at least one of the elongated down tube members.

16. The bicycle of claim 15 wherein the upper and lower elongated down tube members are enclosed within an elongated down tube.

17. The bicycle of claim 15 wherein the longitudinal axis of the elongated seat tube intersects the longitudinal axis of the seat tube sleeve.

18. The bicycle of claim 15 wherein the longitudinal axis of the elongated seat tube sleeve does not intersect the bottom bracket sleeve.

19. The bicycle of claim 15 wherein the longitudinal axis of the elongated seat tube intersects the longitudinal axis of the upper elongated down tube member at a point closer to the first end of the upper elongated down tube member than to the second end of the upper elongated down tube member.

20. The bicycle of claim 15 wherein the longitudinal axis of the elongated seat tube intersects the longitudinal axis of the upper elongated down tube member at a location substantially intermediate between the first and second ends of the upper elongated down tube member.

* * * * *